(12) United States Patent
Gao et al.

(10) Patent No.: US 10,270,260 B2
(45) Date of Patent: Apr. 23, 2019

(54) CROSS-CONNECTION RESOLUTION IN WIRELESS POWER TRANSFER SYSTEMS

(71) Applicant: Intel Corporation, Santa Clara, CA (US)

(72) Inventors: Jie Gao, Sunnyvale, CA (US); Xintian E Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 493 days.

(21) Appl. No.: 14/975,105

(22) Filed: Dec. 18, 2015

(65) Prior Publication Data
US 2017/0179730 A1 Jun. 22, 2017

(51) Int. Cl.
| | |
|---|---|
| *H01F 38/00* | (2006.01) |
| *H02J 5/00* | (2016.01) |
| *H04B 5/00* | (2006.01) |
| *H02J 50/12* | (2016.01) |
| *H02J 50/90* | (2016.01) |

(52) U.S. Cl.
CPC .............. *H02J 5/005* (2013.01); *H02J 50/12* (2016.02); *H02J 50/90* (2016.02); *H04B 5/0037* (2013.01)

(58) Field of Classification Search
USPC ....................................................... 307/104
See application file for complete search history.

(56) References Cited

U.S. PATENT DOCUMENTS

| | | |
|---|---|---|
| 2011/0225305 A1 | 9/2011 | Vedantham et al. |
| 2014/0015334 A1* | 1/2014 | Jung ........................ H02J 50/12 |
| | | 307/104 |
| 2014/0062395 A1 | 3/2014 | Kwon et al. |
| 2014/0159653 A1 | 6/2014 | Von Novak et al. |
| 2014/0253028 A1 | 9/2014 | Lee et al. |
| 2014/0335809 A1 | 11/2014 | Balakrishnan |
| 2016/0087454 A1* | 3/2016 | Tanabe .................... H02J 7/025 |
| | | 307/104 |

OTHER PUBLICATIONS

"International Application Serial No. PCT/US2016/063115, International Search Report dated Mar. 16, 2017", 3 pgs.

(Continued)

*Primary Examiner* — Rexford N Barnie
*Assistant Examiner* — Dru Parries
(74) *Attorney, Agent, or Firm* — Schwegman Lundberg & Woessner, P.A.

(57) ABSTRACT

Power transmitting unit (PTU) usable with a wireless power transfer system to supply power and maintain a control signaling link to a local power receiving unit (PRU). A cross-connection circumstance between the PTU and a remote PRU is determined, where a control signaling link between the PTU and the remote PRU is established in an absence of power transmission to the remote PRU from the PTU. In response to the cross-connection circumstance, the control signaling link with the remote PRU is terminated while the supply of power and the control signaling link with the local PRU is maintained. In a related embodiment, a wrong-placement characteristic where power is transferred to a rogue local PRU in an absence of a control signaling link with that PRU, is detected. In response, the supply of power is maintained for at least a waiting period.

13 Claims, 9 Drawing Sheets

(56) References Cited

OTHER PUBLICATIONS

"International Application Serial No. PCT/US2016/063115, Written Opinion dated Mar. 16, 2017", 8 pgs.

Grajski, Kamil A., et al., "Loosely-Coupled Wireless Power Transfer: Physics, Circuits, Standards", Microwave Workshop Series on Innovative Wireless Power Transmission: Technologies, Systems and Applications (IMWS), 2012, IEEE MTT-S International. DOI: 10.1109/IMWS.2012.6215828, (2012), 7 pgs.

Tseng, Ryan, et al., "Introduction to the Alliance for Wireless Power Loosely-Coupled Wireless Power Transfer System Specification Version 1.0", IEEE Wireless Power Transfer Conference 2013, Technologies, Systems and Applications,, (2013), 6 pgs.

\* cited by examiner

CROSS-CONNECTION RESOLUTION IN WIRELESS POWER TRANSFER SYSTEMS

TECHNICAL FIELD

Aspects of the disclosure relate generally to information processing and communications and, more particularly, to wireless power transfer (WPT) systems, components thereof, and associated operational methodology.

BACKGROUND

Wireless power transfer (WPT) involves the transmission of power from a power transmitting unit (PTU) to one or more power receiving units (PRU). For instance, in one typical application, a charging pad for portable electronic devices uses near-field electromagnetic coupling of power to power-receiving devices such as smartphones, accessories (e.g., wireless headphones), and similar devices. In general operation, when a PRU is placed engaged for WPT with a PTU, the PRU is positioned relative to the PTU so that the electromagnetic coupling may take place. In addition, a separate wireless communication link may be established over which the PTU and PRU can coordinate their WPT-related operations, including session and power control management.

In applications where a single PTU can support multiple PRUs, a cross-connection problem may manifest in situations where a PRU is located within wireless communication proximity with two or more PTUs. A practical solution is needed to better address the issues with cross-connection.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments are directed to wireless power transfer (WPT) equipment and operations. Some embodiments relate to loosely-coupled (LC) WPT, in which non-radiative, near field, resonant power transfer is achieved through mutual coupling of transducers (e.g., resonant or inductive antennas) of the power transmitting unit (PTU) and one or more power receiving units (PRUs). As an example, some embodiments are applicable with WPT systems described in standards such as those promulgated by the Alliance for Wireless Power (A4WP) and the Power Matters Alliance (PMA), now merged as the AirFuel Alliance. In one such embodiment, the WPT is a loosely-coupled wireless power transfer (LC-WPT). Related embodiments may also be applicable outside the specifications or guidelines of particular industry standards. For the sake of brevity, the present disclosure describes embodiments in the context of an A4WP-related system, through it will be understood that various aspects of the embodiments may be more widely applied within the scope of the present disclosure.

Figure 1:
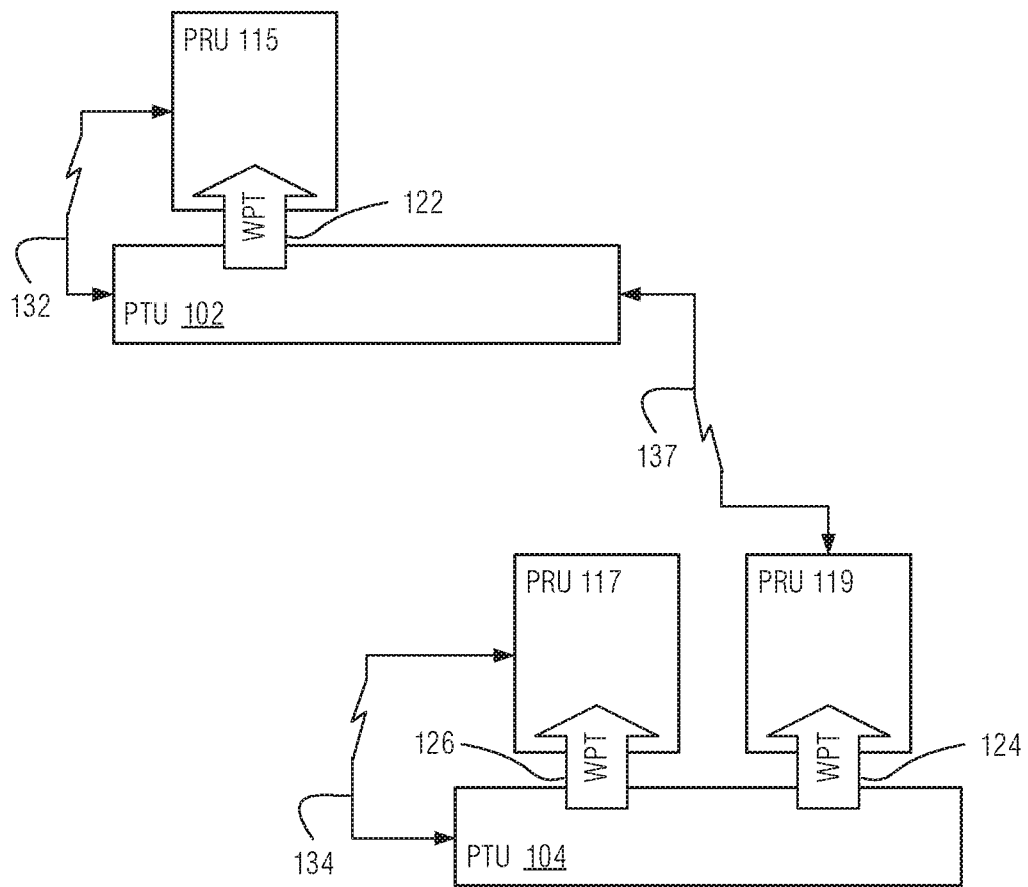
FIG. 1 is a high-level system diagram illustrating an operational example of a wireless power transfer (WPT) system in which multiple power transmitting units (PTUs) are in proximity, leading to a potential for cross-connections with power receiving units (PRUs) in accordance with some embodiments.

FIG. 1 is a high-level system diagram illustrating an operational example of a wireless power transfer (WPT) system in which multiple power transmitting units (PTUs) are in proximity, leading to a potential for cross-connections with power receiving units (PRUs) in accordance with some embodiments. As depicted in this example, PTU 102 and PTU 104 each supply WPT to one or more PRU devices from among PRU 115, PRU 117, and PRU 119. Each PRU 115, 117, 119 may be part of any suitable self-powered device, such as, by way of non-limiting example, a smartphone, tablet computing device, wireless headset/microphone, wireless earphones, smartwatch, physiologic or fitness monitor, portable personal computer, video or photo camera, computer mouse, remote control, or the like. The WPT functionality may be used to charge on-board batteries, power the device for partial or total operability, or some combination thereof.

Each PTU device may have any suitable form factor. For instance, a PTU may be incorporated in a pad designed to lay on a horizontal surface. Other form factors can include incorporation of a PTU into a container lid, a table, desk, or countertop surface, a vehicle dashboard or console, a pedestal, a bookstand or note-stand, a cabinet door, mirror, other non-horizontal surface, or the like.

There is a possibility that a PRU can be coupled for power transfer from a first PTU while being communicatively linked with a second, different, PTU. In this case, the PRU and power transfer-coupled PTU cannot properly coordinate their WPT-related operations.

PTU 102 and PTU 104 are situated within wireless communication proximity with one another's PRU devices, which can result in an undesired cross-connection situation. As depicted, PTU 102 and PTU 104 are in the general vicinity of each other. For example, they may both be situated in the same room, on the same table, desk, or countertop, bookshelf, etc. PTU 122 is engaged with PRU 115 via WPT coupling 122 and wireless control signaling link 132. In similar fashion, PTU 104 is engaged with PRU 117 via WPT coupling 126 and wireless control signaling link 134.

PRU 119 is cross-connected with PTU 102 and 104. As depicted in this example, PRU 119 is partially engaged with PTU 104 via WPT coupling 124, but wireless control signaling link 137 is between PRU 119 and PTU 102. In this situation, the WPT coupling 124 results in unaccounted-for power consumption from PTU 104, taking up energy resources from PTU 104 and potentially resulting in a power transfer parameter mismatch (e.g., insufficient power transfer to PRU 119, over-voltage, etc.). The cross-connection of wireless control signaling link 137 is also not without consequence: through the control signaling, PTU 102 is improperly informed of a power utilization that does not actually take place. This error may cause PTU 102 to have reduced capacity for serving other PRU devices that could otherwise benefit from obtaining WPT from PTU 102.

One conventional approach to dealing with cross-connected PTU and PRU devices has been to detect a lost-power error condition by the PTU to which a rogue PRU is coupled for power transfer (but not for communications). The PTU is configured to cycle power by temporarily powering off, and then re-starting, its WPT operations in response to the lost-power condition, thereby prompting the PRU device to re-attempt its wireless communications connection. This process may take upwards of tens of seconds, and possibly longer, which presents an observable disruption that may affect the user experience of PRU 117.

Figure 2:
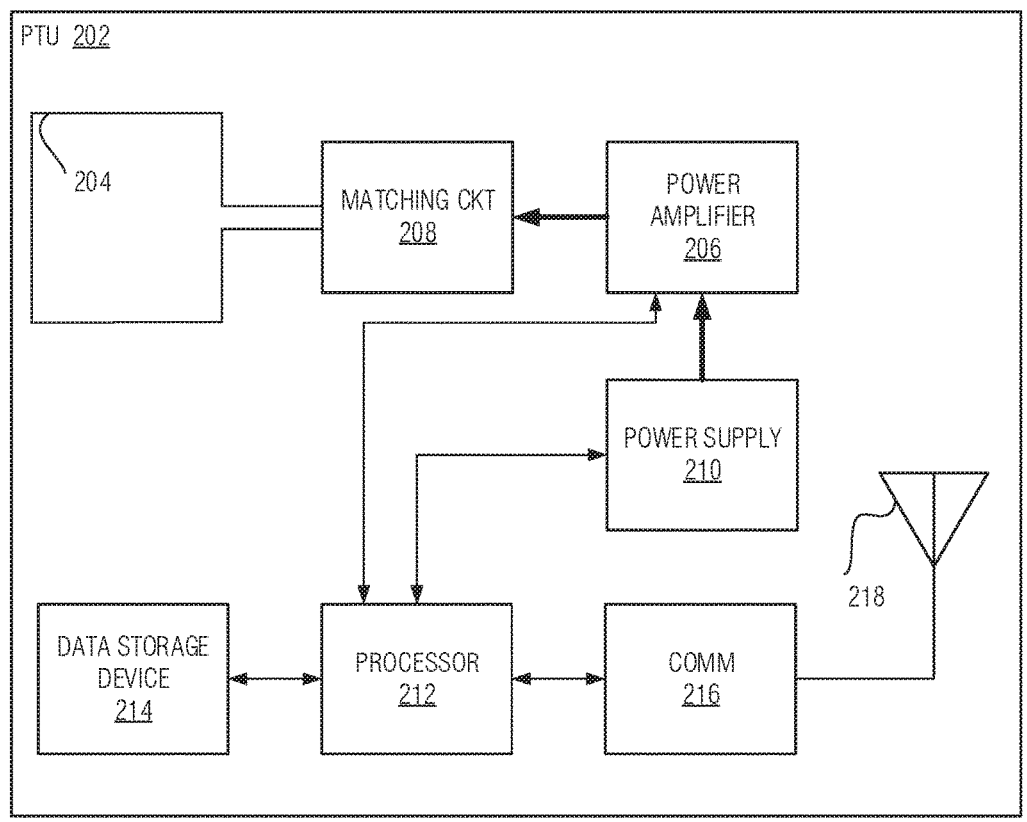
FIG. 2 is a system block diagram illustrating an example PTU in accordance with some embodiments.

FIG. 2 is a system block diagram illustrating an example PTU in accordance with some embodiments. PTU 202 includes at least one power transmission transducer 204. In an embodiment, power transmission transducer 204 is a resonator tuned to an operating frequency. One example of an operating frequency is 6.78 MHz, as called for in the Rezence™ standard promulgated by A4WP, although the scope of the embodiments is not limited in this respect. In another embodiment, power transmission transducer 204 is a planar coil designed for inductive power transfer, such as described in the Qi™ standard promulgated by the Wireless Power Consortium. In other embodiments, any suitable design and construction of a power transmission transducer is contemplated, whether presently known, or arising in the future.

Power transmission transducer 204 is driven by power amplifier circuitry 206 via impedance matching circuitry 208. Power amplifier 206, in turn, is powered via power supply 210, which may convert power from an external or internal power source such as AC mains service, battery power, vehicle power service, etc. Power supply 210 may also distribute power to the other circuitry of PTU 202, though this power distribution is not shown in FIG. 2 for the sake of clarity. Processor 212 controls the operation of PTU 202, including commanding the operation of power amplifier 206 and monitoring its performance, including measuring the loading of the power amplifier 206. Processor 212 may also monitor and control power supply 210, according to certain embodiments. In an embodiment, processor 212 comprises a microcontroller circuit that is based on one or more microprocessor cores, and also includes memory, input/output facilities such as address, data, and control nodes, serial communications via a universal asynchronous receiver/transmitter (UART) device, analog-to digital conversion (A/D) circuitry, digital-to-analog conversion (D/A) circuitry, and the like.

Wireless communications circuitry 216 is configured to carry out the control signaling link between the PTU and PRUs. In general, wireless communications circuitry 216 conduct two-way data communications, under the control of processor 212, over a wireless link, such as Bluetooth Low Energy (BLE) or other suitable communications modality for short-range communications, such as, for example, Wi-Fi, etc., as well as non-radio information carriers (e.g., infrared, ultrasonic, etc.). Wireless communications circuitry 216 is coupled to communications transducer 218, which may be an antenna, as depicted, for radio-frequency implementations, but may take other forms (e.g., light or sound emission/sensing) commensurate with the communication modality.

Data storage device 214, which may be integrated, or interfaced, with processor 212, includes a non-volatile memory or other data storage arrangement that contains instructions that, when executed by processor 212, form a plurality of engines, as will be described below. Also, data storage device 214 can store operational parameters, configuration settings, cryptographic key information, operational logs, and any other information necessary for the operation of PTU 202. In one example embodiment, data storage device 214 is implemented using flash memory technology, though any suitable type of non-volatile memory may be utilized.

Figure 3:
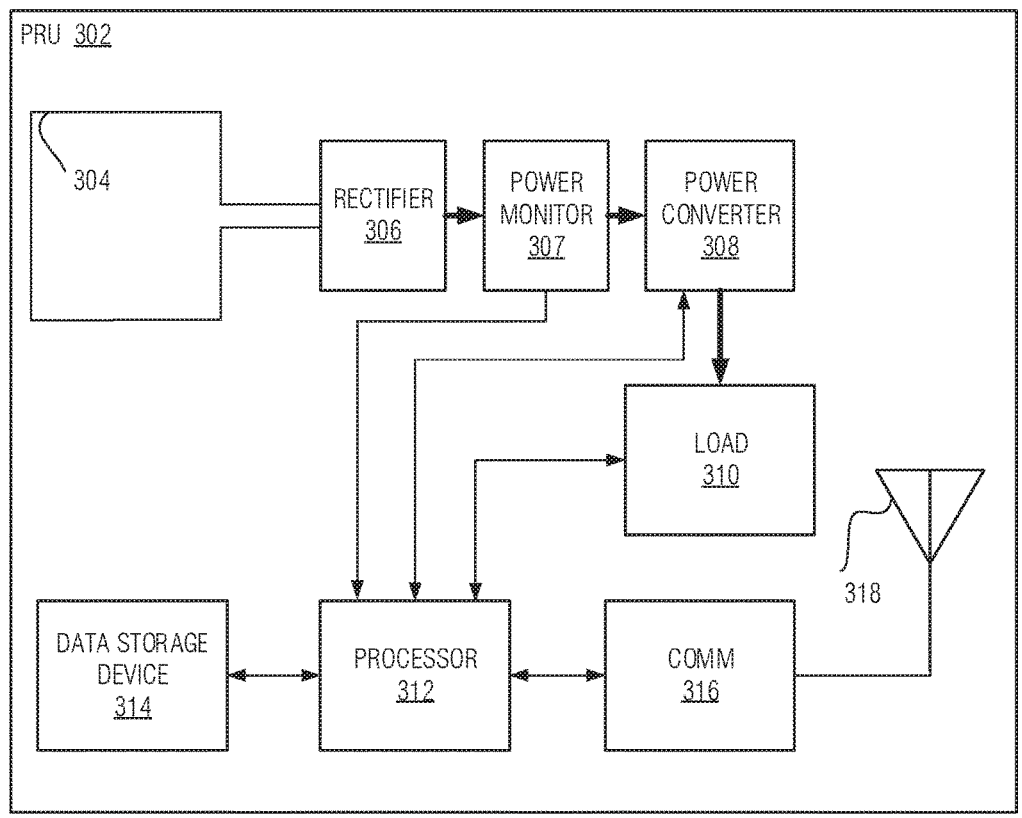
FIG. 3 is a system block diagram illustrating an example PRU in accordance with some embodiments.

FIG. 3 is a system block diagram illustrating an example PRU in accordance with some embodiments. As discussed above, PRU 302 may be incorporated into a portable electronic device, which includes the load 310 to which the WPT is delivered by the other components of PRU 302. Load 310 can include a battery charging circuit, a power distribution circuit, or the like. In a related embodiment, PRU 302 constitutes the battery charging circuit or power distribution circuit for the portable electronic device.

PRU 302 includes a power reception transducer 304 which, according to various embodiments, may be optimized as a resonator or inductive-coupling transducer for receiving WPT. Received power flows to rectifier 306 to be converted to a unipolar signal, such as a full-wave-rectified signal, or a DC signal. Power monitor 307 measures one or more parameters of the transferred power to PRU 302, such as the received voltage, the current being consumed from the WPT, waveform, ripple, etc. In a related embodiment, power monitor 307 is situated on the input side to rectifier 306 rather than on the output side, as shown in the embodiment depicted. Power converter 308 conditions the received power and adjusts the voltage to meet the needs of load 310. Conditioning can include completing the conversion of power to DC, filtering any residual ripple, boosting the voltage, reducing the voltage, etc. In an embodiment, power converter 308 includes a control system and a switching regulator-based circuit that can adapt the voltage to be delivered to load 310 from a wide range of input voltages ranging from values less than the target output voltage to values greater than the target output voltage.

Wireless communications circuitry 316 and communications transducer 318 operate as counterpart communications peers of the control signaling link carried out with PTU 202. In terms of their structure and operations, wireless communications circuitry 316 and communications transducer 318 may be analogous to their counterparts that are in PTU 202, namely, wireless communications circuitry 216 and communications transducer 218, though communications transducer 318 may be of a different size, generally smaller, than its counterpart, communications transducer 218.

Processor 312 monitors and controls the operations of the other components according to instructions on data storage device 314. Processor 312 and data storage device 314 may be analogous in a general sense to processor and data storage device 212 and 214, respectively, of PTU 202.

Notably, in an embodiment, processor 312 uses the output received from power monitor 307 to read data that may be encoded in the WPT waveform. The data may appear as a temporal variation in the voltage of the transferred power signal, and may be encoded as a baseband signal, or modulated onto a carrier wave. In a related embodiment, processor 312 implements a cross connection detection engine that reads data encoded on the WPT waveform that indicates a PTU-specific code, such as a PTU ID, or session ID, for example, and compares this ID against corresponding PTU-specific information transmitted via the control signaling link. In so doing, the cross connection detection engine identifies a cross connection, to which PRU 302 may respond by automatically resetting the WPT session for the purpose of establishing a proper WPT configuration with the correct PTU.

Figure 4:
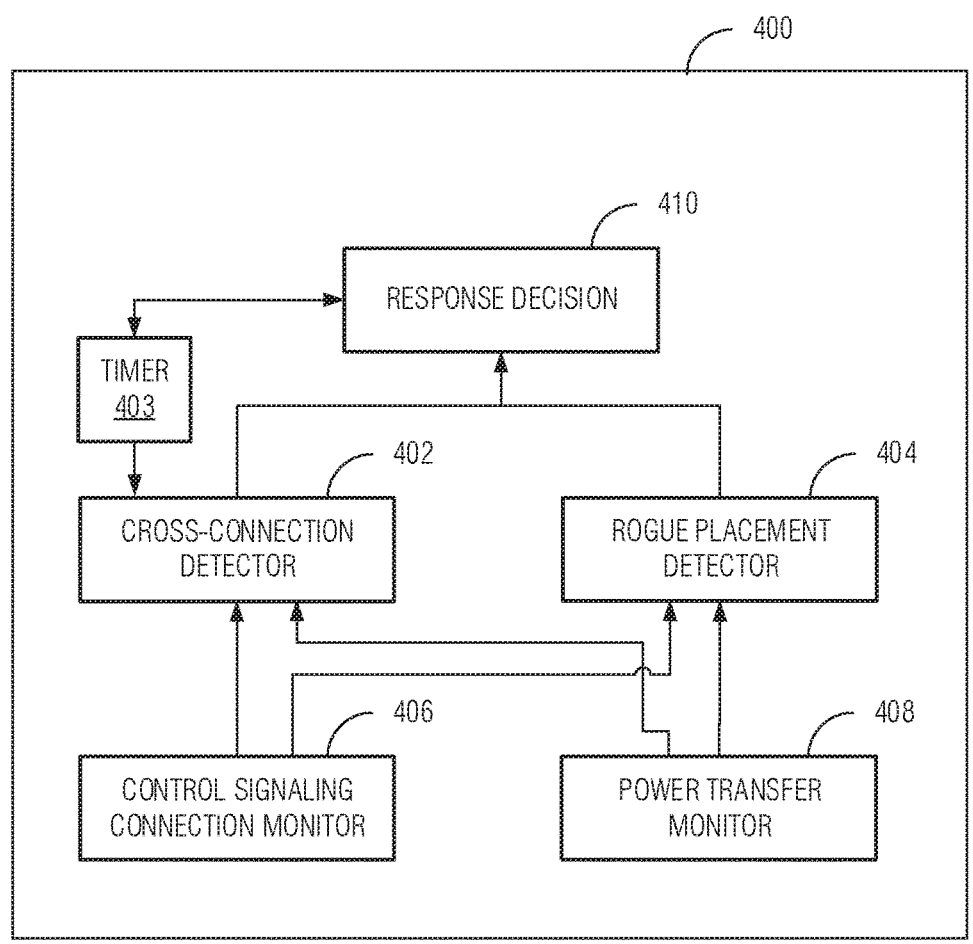
FIG. 4 is a block diagram illustrating an exemplary system architecture of a cross-connection correction engine of a PTU in accordance with some embodiments.

FIG. 4 is a block diagram illustrating an exemplary system architecture of a cross-connection correction engine of a PTU in accordance with some embodiments. The term "engine" as used herein is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which engines are temporarily configured, an engine may be instantiated at particular moments in time. For example, where the engines comprise a general-purpose hardware processor configured using software, the general-purpose hardware processor may be configured as respective different engines at different times. Program instructions may accordingly configure a hardware processor, for example, to constitute a particular engine at one instance of time and to constitute a different engine at a different instance of time.

Cross-connection correction engine 400 is itself composed of a set of engines that include cross-connection detector engine 402, timer 403, rogue placement detector engine 404, control signaling connection monitor 406, power transfer monitor 408, and response decision engine 410. Cross-connection detector engine 402 is programmed, or otherwise configured, to detect a cross-connection circumstance in which there is a control signaling link between PTU and a remote PRU in an absence of power transmission to the remote PRU. Referring to FIG. 1, cross-connection detector engine 402 operates on PTU 102 to detect that PRU 119, which in this case is remote to PTU 102, is cross-connected.

In an embodiment, cross-connection detector engine 402 determines a presence of a cross-connection based on a measurement of relative timing, based on an output of timer 403, between establishment of the control signaling link with the remote PRU and a load variation expectation corresponding to near-field coupling of a local PRU with the power circuitry via the power transmission transducer. In a related embodiment, cross-connection detector engine 402 determines a presence of the cross-connection circumstance based on an indication, via the control signaling link with the remote PRU, of actual received power, (e.g., a measurement of the amount of power transfer received) by the remote PRU. This actual received power value is then used as the load variation expectation to be associated with a presence or absence of a measured load variation by the power circuitry of the PTU that would have corresponded to the actual received power reported. In a more basic embodiment, the load variation expectation is defined as some amount of load increase that is greater than a set threshold, with the threshold being set to an load change amount that exceeds a predefined load variability typically associated with variations in PRU operating regime. This latter embodiment avoids having to receive the actual measured power information from the PRUs.

Rogue placement detector engine 404, according to an embodiment, detects a wrong-placement characteristic in which there is WPT to a rogue local PRU in the absence of a control signaling link with the rogue local PRU. Referring again to FIG. 1, rogue placement detector engine 404 operates on PTU 104 to detect that there is a rogue PRU drawing power via WPT from PTU 104. In this case, PRU 119, which is local to PTU 104, is a rogue PRU. In this embodiment, rogue placement detector engine 404 does not need to identify the rogue PRU; rather, only the presence of the wrong-placement characteristic.

In a related embodiment, rogue placement detector engine 404 includes functionality for detecting rogue objects placed in the electromagnetic field, that are not a PRU, and distinguishing those objects from a rogue PRU. Various techniques for detecting rogue objects are well known, and are not detailed herein, except to point out that any suitable rogue object detection technique, whether currently known, or arising in the future, is contemplated as potentially usable with the embodiments described herein.

Control signaling connection monitor engine 406 is programmed, or otherwise configured, to detect and signal the presence of control signaling links, and extracts relevant information from the control signaling received from linked PRUs. Examples of such relevant information include PTU IDs, PRU IDs, session IDs or other identifying codes, along with power transfer state and measurement information. This information is passed to cross-connection detector engine 402 and rogue placement detector engine 404. Power transfer monitor engine 408 collects information representing the loading of the power transfer circuitry. This information is processed to assess load variations that may correspond to the addition or removal of PRUs. This information is used by cross-connection detector engine 402 and rogue placement detector engine 404 in producing their respective detections.

Response decision engine 410 is programmed, or otherwise configured, to obtain the detections produced by cross-connection detector engine 402 and rogue placement detector engine 404, and to apply decision criteria to perform a suitable action or inaction in the resolution of a cross-connection. Actions include interrupting WPT operation, terminating the control signaling link with specific PRUs, or a combination thereof. An example of an inaction is complying with a configured time delay. In a related embodiment, response decision engine 410 maintains a list of PRUs that are not currently permitted to engage with the PTU for WPT. This list may be dynamic, with the blacklisting of PTUs being subject to expiration after the passage of a configured time duration. In another related embodiment, response decision engine 410 includes criteria for self-adjusting certain other decision criteria based on certain observed or inferred circumstances. For instance, certain responses may require more urgency than others, for the sake of safety or efficiency. In one example, WPT may be disconnected more quickly in response to a cross-connection with a comparatively higher-energy-consuming PRU than with a comparatively lower-energy-consuming PRU.

Figure 5:
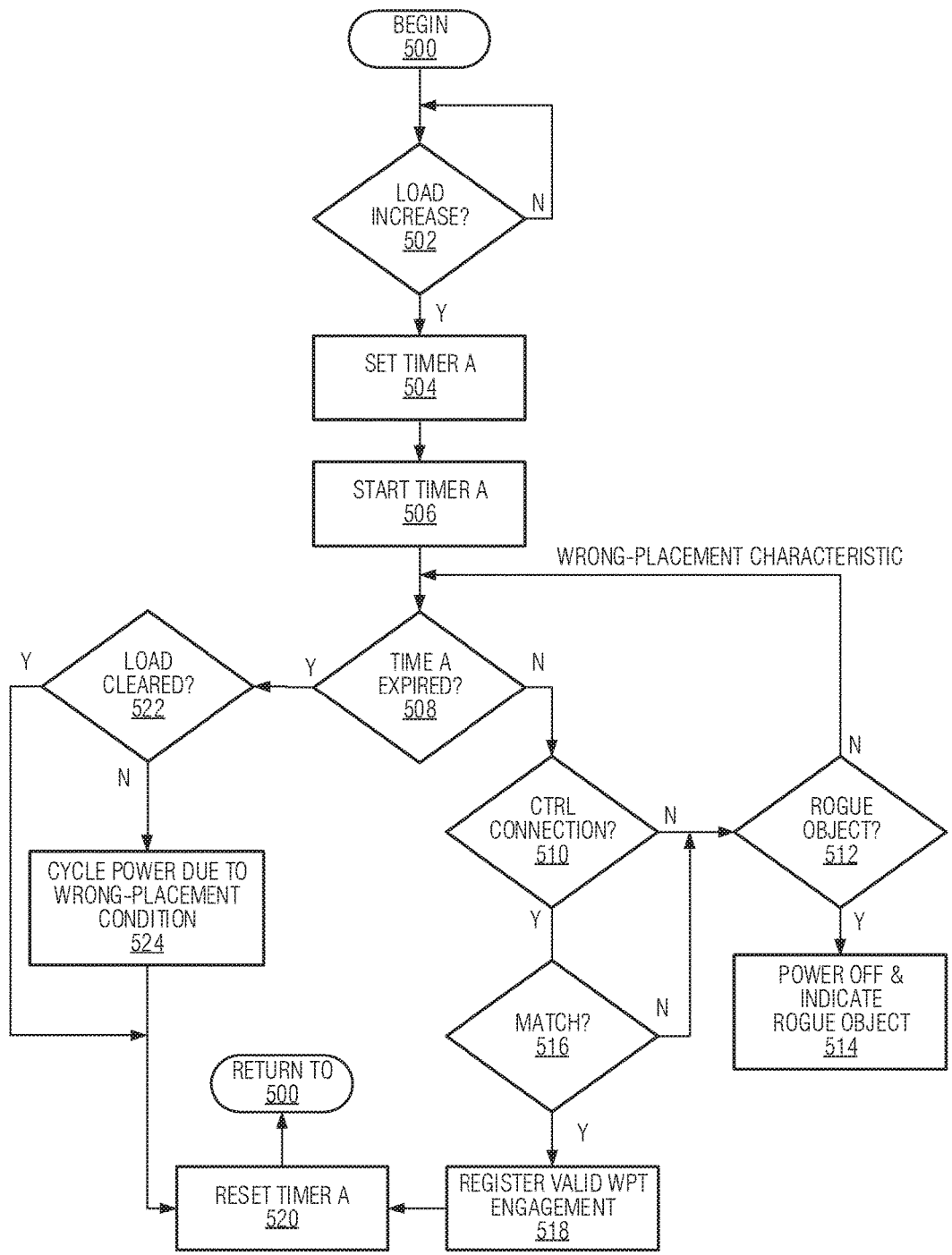
FIG. 5 is a flow diagram illustrating an example sequence of operations and decisions carried out by a cross-connection correction engine of a PTU with which a rogue local PRU has at least partially engaged, in accordance with some embodiments.

FIG. 5 is a flow diagram illustrating an example sequence of operations and decisions carried out by a cross-connection correction engine of a PTU with which a rogue local PRU has at least partially engaged, in accordance with some embodiments. Decision 502 monitors an increase in the loading measured by the WPT power circuitry. In the affirmative case, the process advances to operation 504, in which a timer is set to value A. The setting A for this timer is a time delay setting that represents a time window afforded to the PTU devices in a cross-connect situation to correct the cross-connection problem before PTU 104 is to reset the WPT, thereby disrupting its local PRU(s) to some extent. In a related embodiment, the amount of time delay A may be varied based on the amount of loading increase, with greater loading corresponding to a shorter time delay setting according to preconfigured time adjustment criteria.

At 506, timer A is started, and the process advances to decision 508, which tests whether timer A has expired. While timer A has not yet expired, the process advances to decision 510, which checks whether a control signaling connection has been established with a PRU. In the absence of the control signaling link, the process advances to decision 512, which applies the rogue object (non-PRU) detection criteria to check if the loading increase was due to a non-PRU object, in which case the load variation is not attributable to a cross connection. In the case of a rogue object detection, the WPT is terminated at 514, and a rogue object status may be logged and communicated to any connected PRUs to inform their users.

In the absence of a rogue object detection at 512, a wrong-placement characteristic may be noted, though no action is taken immediately. Instead, the process loops back to 508 to check for expiration of timer A, and any appearance of a control signaling link at 510. In the case where a control signaling link is established, the process advances to decision 516, which checks if the control signaling link is associated with the measured load increase. This may be accomplished according to various embodiments, such as those described in FIGS. 8A and 8B below. In the event of a match, cross-connection correction engine 400 determines that the WPT engagement is valid at 518, and registers it as such for normal operation. Timer A is reset at 520, and the process restarts. In the event of a non-match at 516, the process loops back to decision 512 to check for a rogue object, or otherwise wait for the expiration of timer A in the presence of an apparent wrong-placement characteristic.

Upon the expiration of time A, the process advances to decision 522 to check if the load increase has been resolved, such as by removal of the rogue PRU. In the affirmative case, the process advances to 520 to reset timer A and restart. Otherwise, the process advances to 524 to reset the WPT, which will prompt the engaged PRUs to re-establish their engagements, and give the rogue PRU an opportunity to engage with the PTU correctly.

Figure 6:
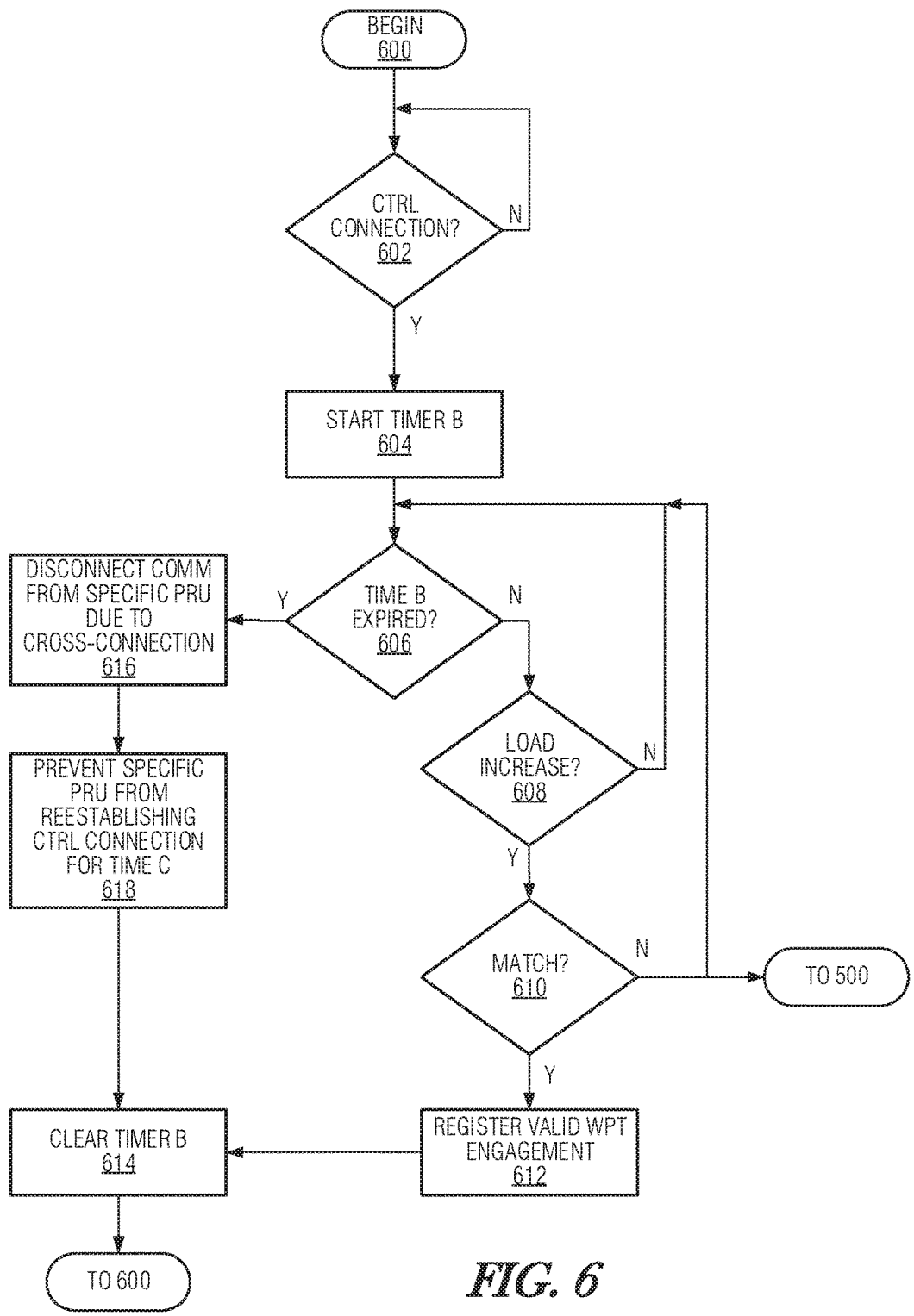
FIG. 6 is a flow diagram illustrating an example sequence of operations and decisions carried out by a cross-connection correction engine of a PTU with which a PRU has established a control signaling link, in accordance with some embodiments.

FIG. 6 is a flow diagram illustrating an example sequence of operations and decisions carried out by a cross-connection correction engine of a PTU with which a PRU has established a control signaling link, in accordance with some embodiments. This process begins at 600. At 602 the PTU waits for establishment of a control signaling link. In the affirmative case, the process advances to 604, where timer B is started. Timer B is set with a shorter time duration than timer A. Time duration B represent a time window in which the WPT power coupling and control signaling link connection are expected to occur in a proper WPT engagement. At 606 the process checks if time B has expired. In the negative case, the process advances to decision 608, in which cross-connection correction engine 400 checks for the occurrence of a load increase. In the absence of a load increase, the process loops back to 606 as timer B continues to run toward expiration.

Figure 8A:
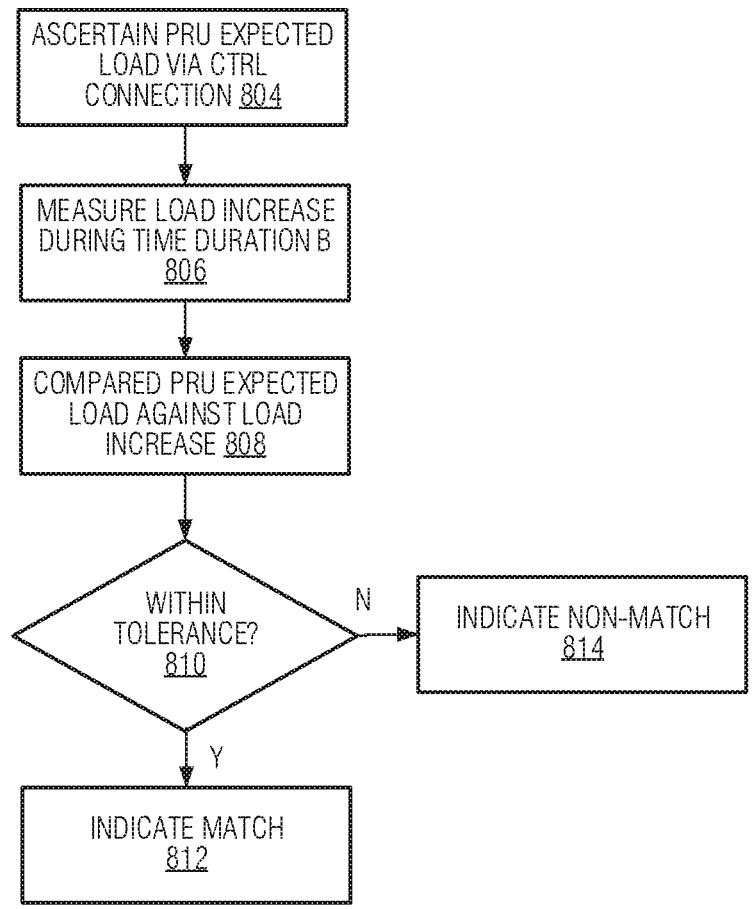
FIGS. 8A and 8B are flow diagrams illustrating an exemplary processes carried out by a cross-connection correction engine in accordance with some embodiments for assessing whether a measured PTU load matches with an established control signaling link with a PRU.
Figure 8B:
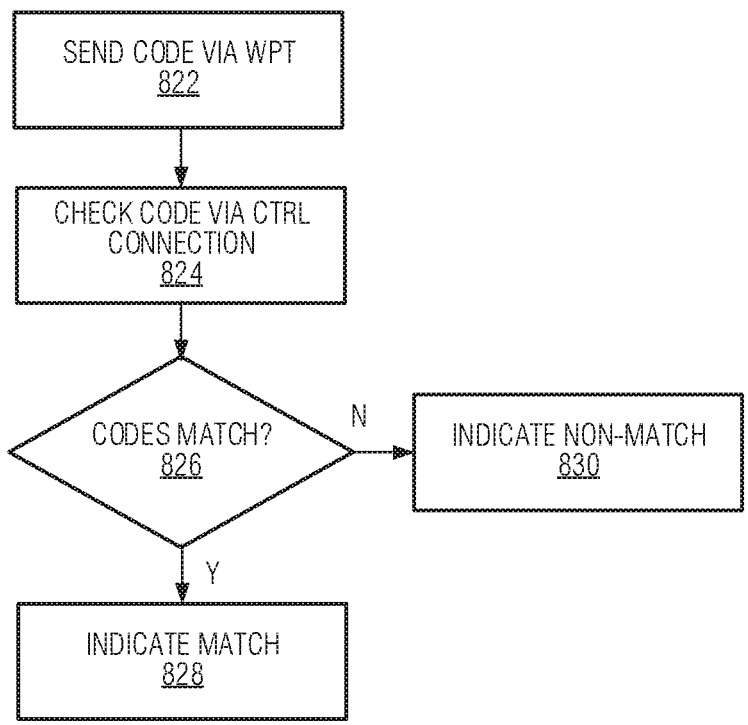

A load increase during time duration B would indicate the possibility of a valid WPT engagement. Accordingly, in this case the process advances to decision 610, in which cross-connection correction engine 400 assesses whether there is a match between the load increase and the PRU with which the control signaling link was established. FIGS. 8A and 8B illustrate example embodiments for performing this decision. In the positive case, a valid WPT engagement is registered at 612, timer B is cleared at 614, and the process is reset to watch for the next control signaling link connection. On the other hand, if decision 610 fails to determine a match, the process loops back to decision 606, and may additionally call the process of FIG. 5 to respond to the load increase.

In response to expiration of timer B, cross-connection correction engine 400 causes the PTU to immediately disconnect the specific control signaling link in question while leaving any other control signaling links and WPT engagements undisturbed, as indicated at operation 616. In addition, at 618, the PRU is temporarily prevented from re-establishing the control signaling link to the PTU for a predetermined time duration C, with the understanding that the disconnected PRU is a remote PRU insofar as this PTU is concerned. In an embodiment, time duration C is sufficiently long that the PRU will preferentially find another PTU with which to establish the control signaling link. The process then advances to 614 to clear timer B and restart.

Figure 7:
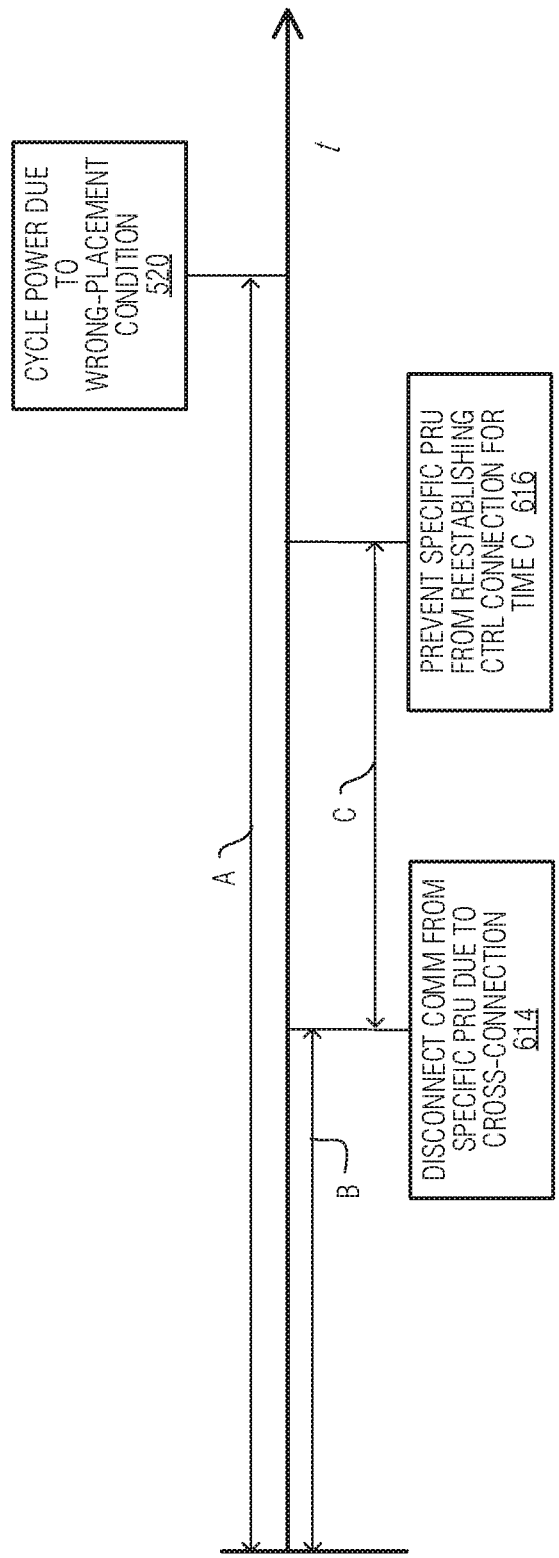
FIG. 7 is a timeline diagram illustrating the relative timings of certain operations of the processes of FIGS. 5-6 in accordance with some embodiments.

FIG. 7 is a timeline diagram illustrating the relative timings of certain operations of the processes of FIGS. 5-6 in accordance with some embodiments. With reference to the system arrangement of FIG. 1, timer A is longer than timer B to allow for PTU 102 to identify the cross-connection and disconnect the control signaling link with remote PRU 119, without disturbing PRU 115 and PRU 117, each of which is validly engaged for WPT with its respective PTU. In the embodiment depicted, time duration B+C is also shorter than time duration A to allow for PTU 119 to be moved to PTU 102 from PTU 104 as a solution to the cross-connection, without disturbing PTU 119.

FIGS. 8A and 8B are flow diagrams illustrating an exemplary processes carried out by a cross-connection correction engine in accordance with some embodiments for assessing whether a measured PTU load matches with an established control signaling link with a PRU. In FIG. 8A, at 804, an expected load for a control-signaling-link-connected PRU is ascertained. This may be accomplished in one example embodiment by simply obtaining a measured power transfer parameter from that PRU. In a related embodiment, the PRU requests a certain amount of power, and the requested amount is assigned by the PTU as being the expected load. In another embodiment, a PRU type indication is obtained via the control signaling link, and a range of WPT loading may be obtained from a lookup table corresponding to the type of PRU. At 806, the load increase at the PTU is measured during the comparatively short time duration B. At 808, a comparison is made between the actual and expected values. If the result of the comparison is similar load values (e.g., within a prescribed tolerance), a match is indicated at 812; otherwise, a non-match is returned at 814.

FIG. 8B illustrates another approach to checking for a match between a PRU connected via a control signaling link, and a PRU at least partially engaged for WPT via the power coupling. At 822, the WPT power amplifier of the PTU sends a code by variation of the voltage, as discussed in one of the example embodiments above. The code can be PTU specific (e.g., a PTU ID), and may further be session-specific e.g., generated based on a timestamp, for instance. At 824, the code is checked via the control signaling link in question. The checking of the code may be accomplished according to a variety of approaches, one of which simply involves the PRU returning a copy of the code via control signaling, and the PTU checking for a match. In another embodiment, cryptography is utilized in connection with the code checking.

If the codes correspond with one another, whether by direct match, or otherwise meeting certain criteria, a match indication is returned at 828. Otherwise, a non-match is returned at 830.

Additional Notes & Examples:

Example 1 is apparatus for a power transmitting unit (PTU) to supply power to a local power receiving unit (PRU) via coupling between a power transmission transducer of the PTU and the PRU, the apparatus comprising: power circuitry to drive the power transmission transducer; wireless communication circuitry to establish a control signaling link with the local PRU; and processing circuitry to control the power circuitry and the wireless communication circuitry to: provide a supply of power and the control signaling link with the local PRU; detect a cross-connection circumstance between the PTU and a remote PRU defined as a control signaling link between the PTU and the remote PRU in an absence of power transmission to the remote PRU; and in response to detection of the cross-connection circumstance, terminate the control signaling link with the remote PRU while the supply of power and the control signaling link is maintained with the local PRU.

In Example 2, the subject matter of Example 1 optionally includes, wherein the control signaling link is a Bluetooth low energy (BLE) link.

In Example 3, the subject matter of any one or more of Examples 1-2 optionally include, wherein the power transmission transducer comprises a resonator coil.

In Example 4, the subject matter of any one or more of Examples 1-3 optionally include, wherein the power circuitry and the wireless communication circuitry are configured for loosely-coupled wireless power transfer (LC-WPT).

In Example 5, the subject matter of any one or more of Examples 1-4 optionally include, wherein the processing circuitry is further configured to control the power circuitry and wireless communication circuitry to: detect the cross-connection circumstance based on a measurement of relative timing between establishment of the control signaling link with the remote PRU and a load variation expectation corresponding to near-field coupling of a local PRU with the power circuitry via the power transmission transducer.

In Example 6, the subject matter of any one or more of Examples 1-5 optionally include, wherein the processing circuitry is further configured to control the power circuitry and wireless communication circuitry to: detect the cross-connection circumstance based on an indication, via the control signaling link with the remote PRU, of received power by the remote PRU, and an absence of a measured load variation by the power circuitry of the PTU.

In Example 7, the subject matter of any one or more of Examples 1-6 optionally include, wherein the processing circuitry is further configured to control the power circuitry and wireless communication circuitry to detect the cross-connection circumstance based on: a communication of a PTU-specific code by variation of supply power via the transmission transducer; and determination, based on communications via the control signaling link, of receipt failure of the PTU-specific code by any PRU.

In Example 8, the subject matter of any one or more of Examples 1-7 optionally include, wherein the processing circuitry is further configured to control the power circuitry and wireless communication circuitry to: terminate the control signaling link with the remote PRU within a predefined time duration b; and maintain the supply of power and the control signaling link with the local PRU for a time duration a, wherein a is greater than b.

In Example 9, the subject matter of any one or more of Examples 1-8 optionally include, wherein the processing circuitry is further configured to control the power circuitry and wireless communication circuitry to: in response to termination of the control signaling link with the remote PRU, prevent establishment of a control signaling link with the remote PRU for a predefined time duration.

In Example 10, the subject matter of any one or more of Examples 1-9 optionally include, wherein the processing circuitry is further configured to control the power circuitry and wireless communication circuitry to: detect a wrong-placement characteristic wherein power is transferred to a rogue local PRU via the power transmission transducer in an absence of a control signaling link with the rogue local PRU; and in response to the wrong-placement characteristic: maintain the supply of power via the power transmission transducer for at least a waiting period; during the waiting period, monitor for cessation of the wrong-placement characteristic; in response to cessation of the wrong placement characteristic during the waiting period, maintain the supply of power via the power transmission transducer; in response to non-cessation of the wrong placement characteristic during the waiting period, terminate the supply of power via the power transmission transducer.

In Example 11, the subject matter of Example 10 optionally includes, wherein the processing circuitry is further configured to control the power circuitry and wireless communication circuitry to: detect a presence of a non-PRU rogue object; in response to the presence of the non-PRU rogue object, terminate the supply of power immediately.

In Example 12, the subject matter of any one or more of Examples 10-11 optionally include, wherein the processing circuitry is further configured to control the power circuitry and wireless communication circuitry to: adjust the waiting period based on an amount of output power being supplied via the power transmission transducer.

In Example 13, the subject matter of any one or more of Examples 10-12 optionally include, wherein the processing circuitry is further configured to control the power circuitry and wireless communication circuitry to: in response to the wrong-placement characteristic, communicate a PTU-specific code by variation of supply power via the transmission transducer.

In Example 14, the subject matter of any one or more of Examples 1-13 optionally include, wherein the processing circuitry is further configured to control the power circuitry and wireless communication circuitry to: send a PTU-specific code to each PRU via the control signaling link.

Example 15 is apparatus for a power transmitting unit (PTU) to supply power to a local power receiving unit (PRU) via coupling between a power transmission transducer of the PTU and the PRU, the apparatus comprising: power circuitry to drive the power transmission transducer; wireless communication circuitry to establish a control signaling link with the local PRU; and processing circuitry to control the power circuitry and wireless communication circuitry to: provide a supply of power and the control signaling link with the local PRU; detect a wrong-placement characteristic comprising power transfer to a rogue local PRU via the power transmission transducer in an absence of a control signaling link with the rogue local PRU; and in response to detection of the wrong-placement characteristic, maintain the supply of power for at least a waiting period.

In Example 16, the subject matter of Example 15 optionally includes, wherein the processing circuitry is to control the power circuitry and wireless communication circuitry to: monitor for cessation of the wrong-placement characteristic during the waiting period; and in response to an expiration of the waiting period and a non-cessation of the wrong-placement characteristic during the waiting period, interrupt the supply of power.

In Example 17, the subject matter of any one or more of Examples 15-16 optionally include, wherein the power transmission transducer comprises a resonator coil.

In Example 18, the subject matter of any one or more of Examples 15-17 optionally include, wherein the control signaling link is a Bluetooth low energy (BLE) link.

In Example 19, the subject matter of any one or more of Examples 15-18 optionally include, wherein the power circuitry and the wireless communication circuitry are configured to establish loosely-coupled wireless power transfer (LC-WPT).

In Example 20, the subject matter of any one or more of Examples 15-19 optionally include, wherein the processing circuitry is further configured to control the power circuitry and wireless communication circuitry to: in response to cessation of the wrong placement characteristic during the waiting period, maintain the supply of power via the power transmission transducer; and in response to non-cessation of the wrong placement characteristic during the waiting period, terminate the supply of power via the power transmission transducer.

In Example 21, the subject matter of any one or more of Examples 15-20 optionally include, wherein the processing circuitry is further configured to control the power circuitry and wireless communication circuitry to: adjust the waiting period based on an amount of output power being supplied via the power transmission transducer.

In Example 22, the subject matter of any one or more of Examples 15-21 optionally include, wherein the processing circuitry is further configured to control the power circuitry and wireless communication circuitry to: detect a presence of a non-PRU rogue object; in response to the presence of the non-PRU rogue object, terminate the supply of power immediately.

In Example 23, the subject matter of any one or more of Examples 15-22 optionally include, wherein the processing circuitry is further configured to control the power circuitry and wireless communication circuitry to: in response to the wrong-placement characteristic, communicate a PTU-specific code by variation of supply power via the transmission transducer.

In Example 24, the subject matter of any one or more of Examples 15-23 optionally include, wherein the processing circuitry is further configured to control the power circuitry and wireless communication circuitry to: detect a cross-connection circumstance between the PTU and a remote PRU wherein a control signaling link exists between the PTU and the remote PRU in an absence of power transmission to the remote PRU via the power transmission transducer; in response to the cross-connection circumstance detection, terminate the control signaling link with the remote PRU while the supply of power and the control signaling link is maintained with the local PRU.

In Example 25, the subject matter of Example 24 optionally includes, wherein the processing circuitry is further configured to control the power circuitry and wireless communication circuitry to: detect the cross-connection circumstance based on a measurement of relative timing between establishment of the control signaling link with the remote PRU and a load variation expectation corresponding to near-field coupling of a local PRU with the power circuitry via the power transmission transducer.

In Example 26, the subject matter of any one or more of Examples 24-25 optionally include, wherein the processing circuitry is further configured to control the power circuitry and wireless communication circuitry to: detect the cross-connection circumstance based on an indication, via the control signaling link with the remote PRU, of received power by the remote PRU, and an absence of a measured load variation by the power circuitry of the PTU.

In Example 27, the subject matter of any one or more of Examples 24-26 optionally include, wherein the processing circuitry is further configured to control the power circuitry and wireless communication circuitry to detect the cross-connection circumstance based on: a communication of a PTU-specific code by variation of supply power via the transmission transducer; and determination, based on communications via the control signaling link, of receipt failure of the PTU-specific code by any PRU.

In Example 28, the subject matter of any one or more of Examples 24-27 optionally include, wherein the processing circuitry is further configured to control the power circuitry and wireless communication circuitry to: terminate the control signaling link with the remote PRU within a predefined time duration b, and maintain the supply of power and the control signaling link with the local PRU for a time duration a, wherein a is greater than b.

In Example 29, the subject matter of any one or more of Examples 24-28 optionally include, wherein the processing circuitry is further configured to control the power circuitry and wireless communication circuitry to: in response to termination of the control signaling link with the remote PRU, prevent establishment of a control signaling link with the remote PRU for a predefined time duration.

Example 30 is a computer-readable storage medium containing instructions for automatically operating a power transmitting unit (PTU) to supply power to a local power receiving unit (PRU) via coupling between a power transmission transducer of the PTU and the local PRU, the instructions, when executed by a processor of the PTU, cause the PTU to: provide a supply of power to the local PRU via the power transmission transducer; maintain a control signaling link with the local PRU; detect a cross-connection circumstance between the PTU and a remote PRU comprising a control signaling link between the PTU and the remote PRU in an absence of power transmission to the remote PRU via the power transmission transducer; and in response to detection of the cross-connection circumstance, terminate the control signaling link with the remote PRU while maintaining the supply of power and the control signaling link with the local PRU.

In Example 31, the subject matter of Example 30 optionally includes, wherein the instructions, when executed, further cause the PTU to: detect the cross-connection circumstance based on a measurement of relative timing between establishment of the control signaling link with the remote PRU and a load variation expectation corresponding to near-field coupling of a local PRU via the power transmission transducer.

In Example 32, the subject matter of any one or more of Examples 30-31 optionally include, wherein the instructions, when executed, further cause the PTU to: detect the cross-connection circumstance based on an indication, via the control signaling link with the remote PRU, of received power by the remote PRU, and an absence of a measured load variation by the power circuitry of the PTU.

In Example 33, the subject matter of any one or more of Examples 30-32 optionally include, wherein the instructions, when executed, further cause the PTU to detect the cross-connection circumstance based on: a communication of a PTU-specific code by variation of supply power; and determination, based on communications via the control signaling link, of receipt failure of the PTU-specific code by any PRU.

In Example 34, the subject matter of any one or more of Examples 30-33 optionally include, wherein the instructions, when executed, further cause the PTU to: maintain the supply of power and the control signaling link with the local PRU for at least a time duration a; and terminate the control signaling link with the remote PRU within a predefined time duration b; wherein a is greater than b.

In Example 35, the subject matter of any one or more of Examples 30-34 optionally include, wherein the instructions, when executed, further cause the PTU to: in response to termination of the control signaling link with the remote PRU, prevent establishment of a control signaling link with the remote PRU for a predefined time duration.

In Example 36, the subject matter of any one or more of Examples 30-35 optionally include, wherein the instructions, when executed, further cause the PTU to: detect a wrong-placement characteristic wherein power is transferred to a rogue local PRU via the power transmission transducer in an absence of a control signaling link with the rogue local PRU; and in response to the wrong-placement characteristic: maintain the supply of power via the power transmission transducer for at least a waiting period; during the waiting period, monitor for cessation of the wrong-placement characteristic; in response to cessation of the wrong placement characteristic during the waiting period, maintain the supply of power via the power transmission transducer; in response to non-cessation of the wrong placement characteristic during the waiting period, terminate the supply of power via the power transmission transducer.

In Example 37, the subject matter of Example 36 optionally includes, wherein the instructions, when executed, further cause the PTU to: detect a presence of a non-PRU rogue object; in response to the presence of the non-PRU rogue object, terminate the supply of power immediately.

In Example 38, the subject matter of any one or more of Examples 36-37 optionally include, wherein the instructions, when executed, further cause the PTU to: adjust the waiting period based on an amount of output power being supplied via the power transmission transducer.

In Example 39, the subject matter of any one or more of Examples 36-38 optionally include, wherein the instructions, when executed, further cause the PTU to: in response to the wrong-placement characteristic, communicate a PTU-specific code by variation of supply power via the transmission transducer.

In Example 40, the subject matter of any one or more of Examples 30-39 optionally include, wherein the instructions, when executed, further cause the PTU to: send a PTU-specific code to each PRU via the control signaling link.

Example 41 is a computer-readable storage medium containing instructions for automatically operating a power transmitting unit (PTU) to supply power to a local power receiving unit (PRU) via coupling between a power transmission transducer of the PTU and the local PRU, the instructions, when executed by a processor of the PTU, cause the PTU to: provide a supply of power to the local PRU via the power transmission transducer; maintain a control signaling link with the local PRU; detect a wrong-placement characteristic comprising power transfer to a rogue local PRU via the power transmission transducer in an absence of a control signaling link with the rogue local PRU; and in response to detection of the wrong-placement characteristic, maintain the supply of power via the power transmission transducer for at least a waiting period.

In Example 42, the subject matter of Example 41 optionally includes, wherein the instructions, when executed, further cause the PTU to monitor for cessation of the wrong-placement characteristic during the waiting period and, in response to an expiration of the waiting period and no cessation of the wrong-placement characteristic during the waiting period, interrupt the supply of power.

In Example 43, the subject matter of any one or more of Examples 41-42 optionally include, wherein the instructions, when executed, further cause the PTU to: in response to cessation of the wrong placement characteristic during the waiting period, maintain the supply of power via the power transmission transducer; and in response to non-cessation of the wrong placement characteristic during the waiting period, terminate the supply of power via the power transmission transducer.

In Example 44, the subject matter of any one or more of Examples 41-43 optionally include, wherein the instructions, when executed, further cause the PTU to: adjust the waiting period based on an amount of output power being supplied via the power transmission transducer.

In Example 45, the subject matter of any one or more of Examples 41-44 optionally include, wherein the instructions, when executed, further cause the PTU to: detect a presence of a non-PRU rogue object; in response to detection of the presence of the non-PRU rogue object, terminate the supply of power immediately.

In Example 46, the subject matter of any one or more of Examples 41-45 optionally include, wherein the instructions, when executed, further cause the PTU to: in response to the wrong-placement characteristic, communicate a PTU-specific code by variation of supply power via the transmission transducer.

In Example 47, the subject matter of any one or more of Examples 41-46 optionally include, wherein the instructions, when executed, further cause the PTU to: detect a cross-connection circumstance between the PTU and a remote PRU wherein a control signaling link exists between the PTU and the remote PRU in an absence of power transmission to the remote PRU via the power transmission transducer; in response to detect the cross-connection circumstance, terminate the control signaling link with the remote PRU while maintaining the supply of power and the control signaling link with the local PRU.

In Example 48, the subject matter of Example 47 optionally includes, wherein the instructions, when executed, further cause the PTU to: detect the cross-connection circumstance based on a measurement of relative timing between establishment of the control signaling link with the remote PRU and a load variation expectation corresponding to near-field coupling of a local PRU with the power circuitry via the power transmission transducer.

In Example 49, the subject matter of any one or more of Examples 47-48 optionally include, wherein the instructions, when executed, further cause the PTU to: detect the cross-connection circumstance based on an indication, via the control signaling link with the remote PRU, of received power by the remote PRU, and an absence of a measured load variation by the power circuitry of the PTU.

In Example 50, the subject matter of any one or more of Examples 47-49 optionally include, wherein the instructions, when executed, further cause the PTU to detect the cross-connection circumstance based on: a communication of a PTU-specific code by variation of supply power; and determination, based on communications via the control signaling link, of receipt failure of the PTU-specific code by any PRU.

In Example 51, the subject matter of any one or more of Examples 47-50 optionally include, wherein the instructions, when executed, further cause the PTU to: terminate the control signaling link with the remote PRU within a predefined time duration b; and maintain the supply of power and the control signaling link with the local PRU for a time duration a; wherein a is greater than b.

In Example 52, the subject matter of any one or more of Examples 47-51 optionally include, wherein the instructions, when executed, further cause the PTU to: in response to termination of the control signaling link with the remote PRU, prevent establishment of a control signaling link with the remote PRU for a predefined time duration.

Example 53 is a method for automatically operating a power transmitting unit (PTU) to supply power to a local power receiving unit (PRU) via coupling between a power transmission transducer of the PTU and the local PRU, the method comprising: providing a supply of power to the local PRU via the power transmission transducer; maintaining a control signaling link with the local PRU; detecting a cross-connection circumstance between the PTU and a remote PRU comprising a control signaling link between the PTU and the remote PRU in an absence of power transmission to the remote PRU via the power transmission transducer; and in response to detecting of the cross-connection circumstance, terminating the control signaling link with the remote PRU while maintaining the supply of power and the control signaling link with the local PRU.

In Example 54, the subject matter of Example 53 optionally includes, wherein maintaining the control signaling link includes maintaining a Bluetooth low energy (BLE) link.

In Example 55, the subject matter of any one or more of Examples 53-54 optionally include, further comprising: detecting the cross-connection circumstance based on a measurement of relative timing between establishment of the control signaling link with the remote PRU and a load variation expectation corresponding to near-field coupling of a local PRU via the power transmission transducer.

In Example 56, the subject matter of any one or more of Examples 53-55 optionally include, further comprising: detecting the cross-connection circumstance based on an indication, via the control signaling link with the remote PRU, of received power by the remote PRU, and an absence of a measured load variation by the power circuitry of the PTU.

In Example 57, the subject matter of any one or more of Examples 53-56 optionally include, further comprising: detecting the cross-connection circumstance based on: communicating a PTU-specific code by varying supply power; and determining, based on communicating via the control signaling link, of receipt failure of the PTU-specific code by any PRU.

In Example 58, the subject matter of any one or more of Examples 53-57 optionally include, further comprising: maintaining the supply of power and the control signaling link with the local PRU for at least a time duration a; and terminating the control signaling link with the remote PRU within a predefined time duration b; wherein a is greater than b.

In Example 59, the subject matter of any one or more of Examples 53-58 optionally include, further comprising: in response to termination of the control signaling link with the remote PRU, preventing establishment of a control signaling link with the remote PRU for a predefined time duration.

In Example 60, the subject matter of any one or more of Examples 53-59 optionally include, further comprising: detecting a wrong-placement characteristic wherein power is transferred to a rogue local PRU via the power transmission transducer in an absence of a control signaling link with the rogue local PRU; and in response to the wrong-placement characteristic: maintaining the supply of power via the power transmission transducer for at least a waiting period; during the waiting period, monitoring for cessation of the wrong-placement characteristic; in response to cessation of the wrong placement characteristic during the waiting period, maintaining the supply of power via the power transmission transducer; in response to non-cessation of the wrong placement characteristic during the waiting period, terminating the supply of power via the power transmission transducer.

In Example 61, the subject matter of Example 60 optionally includes, further comprising: detecting a presence of a non-PRU rogue object; in response to the presence of the non-PRU rogue object, terminating the supply of power immediately.

In Example 62, the subject matter of any one or more of Examples 60-61 optionally include, further comprising: adjusting the waiting period based on an amount of output power being supplied via the power transmission transducer.

In Example 63, the subject matter of any one or more of Examples 60-62 optionally include, further comprising: in response to the wrong-placement characteristic, communicating a PTU-specific code by variation of supply power via the transmission transducer.

In Example 64, the subject matter of any one or more of Examples 53-63 optionally include, further comprising: sending a PTU-specific code to each PRU via the control signaling link.

Example 65 is a method for automatically operating a power transmitting unit (PTU) to supply power to a local power receiving unit (PRU) via coupling between a power transmission transducer of the PTU and the local PRU, the method comprising: providing a supply of power to the local PRU via the power transmission transducer; maintaining a control signaling link with the local PRU; detecting a wrong-placement characteristic comprising power transfer to a rogue local PRU via the power transmission transducer in an absence of a control signaling link with the rogue local PRU; in response to detecting the wrong-placement characteristic, and maintaining the supply of power via the power transmission transducer for at least a waiting period.

In Example 66, the subject matter of Example 65 optionally includes, further comprising: monitoring for cessation of the wrong-placement characteristic during the waiting period; and in response to an expiration of the waiting period and a non-cessation of the wrong-placement characteristic during the waiting period, interrupting the supply of power.

In Example 67, the subject matter of any one or more of Examples 65-66 optionally include, further comprising: in response to cessation of the wrong placement characteristic during the waiting period, maintaining the supply of power via the power transmission transducer; and in response to non-cessation of the wrong placement characteristic during the waiting period, terminating the supply of power via the power transmission transducer.

In Example 68, the subject matter of any one or more of Examples 65-67 optionally include, further comprising: adjusting the waiting period based on an amount of output power being supplied via the power transmission transducer.

In Example 69, the subject matter of any one or more of Examples 65-68 optionally include, further comprising: detecting a presence of a non-PRU rogue object; in response to detecting the presence of the non-PRU rogue object, terminating the supply of power immediately.

In Example 70, the subject matter of any one or more of Examples 65-69 optionally include, further comprising: in response to the wrong-placement characteristic, communicating a PTU-specific code by variation of supply power via the transmission transducer.

In Example 71, the subject matter of any one or more of Examples 65-70 optionally include, further comprising: detecting a cross-connection circumstance between the PTU and a remote PRU wherein a control signaling link exists between the PTU and the remote PRU in an absence of power transmission to the remote PRU via the power transmission transducer; in response to detecting the cross-connection circumstance, terminating the control signaling link with the remote PRU while maintaining the supply of power and the control signaling link with the local PRU.

In Example 72, the subject matter of Example 71 optionally includes, further comprising: detecting the cross-connection circumstance based on a measurement of relative timing between establishment of the control signaling link with the remote PRU and a load variation expectation corresponding to near-field coupling of a local PRU with the power circuitry via the power transmission transducer.

In Example 73, the subject matter of any one or more of Examples 71-72 optionally include, further comprising: detecting the cross-connection circumstance based on an indication, via the control signaling link with the remote PRU, of received power by the remote PRU, and an absence of a measured load variation by the power circuitry of the PTU.

In Example 74, the subject matter of any one or more of Examples 71-73 optionally include, further comprising: detecting the cross-connection circumstance based on: communicating a PTU-specific code by varying supply power; and determining, based on communicating via the control signaling link, of receipt failure of the PTU-specific code by any PRU.

In Example 75, the subject matter of any one or more of Examples 71-74 optionally include, further comprising: terminating the control signaling link with the remote PRU within a predefined time duration b; and maintaining the supply of power and the control signaling link with the local PRU for a time duration a; wherein a is greater than b.

In Example 76, the subject matter of any one or more of Examples 71-75 optionally include, further comprising: in response to termination of the control signaling link with the remote PRU, preventing establishment of a control signaling link with the remote PRU for a predefined time duration.

In Example 77, the subject matter of any one or more of Examples 65-76 optionally include, wherein maintaining the control signaling link includes maintaining a Bluetooth low energy (BLE) link.

Example 78 is apparatus for a power transmitting unit (PTU) to supply power to a local power receiving unit (PRU) via coupling between a power transmission means of the PTU and a power reception means of the PRU, the apparatus comprising: means for providing a supply of power to the local PRU via the power transmission means; means for maintaining a control signaling link with the local PRU; means for detecting a cross-connection circumstance between the PTU and a remote PRU comprising a control signaling link between the PTU and the remote PRU in an absence of power transmission to the remote PRU via the power transmission means; and means for terminating the control signaling link with the remote PRU while maintaining the supply of power and the control signaling link with the local PRU, in response to detecting of the cross-connection circumstance.

In Example 79, the subject matter of Example 78 optionally includes, further comprising: means for detecting the cross-connection circumstance based on a measurement of relative timing between establishment of the control signaling link with the remote PRU and a load variation expectation corresponding to near-field coupling of a local PRU via the power transmission means.

In Example 80, the subject matter of any one or more of Examples 78-79 optionally include, further comprising: means for detecting the cross-connection circumstance based on an indication, via the control signaling link with the remote PRU, of received power by the remote PRU, and an absence of a measured load variation by the power circuitry of the PTU.

In Example 81, the subject matter of any one or more of Examples 78-80 optionally include, further comprising: means for detecting the cross-connection circumstance based on: communicating a PTU-specific code by varying supply power; and determining, based on communicating via the control signaling link, of receipt failure of the PTU-specific code by any PRU.

In Example 82, the subject matter of any one or more of Examples 78-81 optionally include, further comprising: means for maintaining the supply of power and the control signaling link with the local PRU for at least a time duration a; and means for terminating the control signaling link with the remote PRU within a predefined time duration b; wherein a is greater than b.

In Example 83, the subject matter of any one or more of Examples 78-82 optionally include, further comprising: means for preventing establishment of a control signaling link with the remote PRU for a predefined time duration, in response to termination of the control signaling link with the remote PRU.

In Example 84, the subject matter of any one or more of Examples 78-83 optionally include, further comprising: means for detecting a wrong-placement characteristic wherein power is transferred to a rogue local PRU via the power transmission means in an absence of a control signaling link with the rogue local PRU; and means for maintaining the supply of power via the power transmission means for at least a waiting period in response to the wrong-placement characteristic; means for monitoring for cessation of the wrong-placement characteristic during the waiting period; means for maintaining the supply of power via the power transmission means in response to cessation of the wrong placement characteristic during the waiting period; means for terminating the supply of power via the power transmission means in response to non-cessation of the wrong placement characteristic during the waiting period.

In Example 85, the subject matter of Example 84 optionally includes, further comprising: means for detecting a presence of a non-PRU rogue object; and means for terminating the supply of power immediately in response to the presence of the non-PRU rogue object.

In Example 86, the subject matter of any one or more of Examples 84-85 optionally include, further comprising:

means for adjusting the waiting period based on an amount of output power being supplied via the power transmission means.

In Example 87, the subject matter of any one or more of Examples 84-86 optionally include, further comprising: means for communicating a PTU-specific code by variation of supply power via the transmission means in response to the wrong-placement characteristic.

In Example 88, the subject matter of any one or more of Examples 78-87 optionally include, further comprising: means for sending a PTU-specific code to each PRU via the control signaling link.

Example 89 is a method for automatically operating a power transmitting unit (PTU) to supply power to a local power receiving unit (PRU) via coupling between a power transmission means of the PTU and a power reception means of the local PRU, the method comprising: means for providing a supply of power to the local PRU via the power transmission means; means for maintaining a control signaling link with the local PRU; means for detecting a wrong-placement characteristic comprising power transfer to a rogue local PRU via the power transmission means in an absence of a control signaling link with the rogue local PRU; and means for maintaining the supply of power via the power transmission means for at least a waiting period in response to detecting the wrong-placement characteristic.

In Example 90, the subject matter of Example 89 optionally includes, further comprising: means for monitoring for cessation of the wrong-placement characteristic during the waiting period; and means for interrupting the supply of power in response to an expiration of the waiting period and a non-cessation of the wrong-placement characteristic during the waiting period.

In Example 91, the subject matter of any one or more of Examples 89-90 optionally include, further comprising: means for maintaining the supply of power via the power transmission means in response to cessation of the wrong placement characteristic during the waiting period; and means for terminating the supply of power via the power transmission means in response to non-cessation of the wrong placement characteristic during the waiting period.

In Example 92, the subject matter of any one or more of Examples 89-91 optionally include, further comprising: means for adjusting the waiting period based on an amount of output power being supplied via the power transmission means.

In Example 93, the subject matter of any one or more of Examples 89-92 optionally include, further comprising: means for detecting a presence of a non-PRU rogue object; means for terminating the supply of power immediately in response to detecting the presence of the non-PRU rogue object.

In Example 94, the subject matter of any one or more of Examples 89-93 optionally include, further comprising: means for communicating a PTU-specific code by variation of supply power via the transmission means in response to the wrong-placement characteristic.

In Example 95, the subject matter of any one or more of Examples 89-94 optionally include, further comprising: means for detecting a cross-connection circumstance between the PTU and a remote PRU wherein a control signaling link exists between the PTU and the remote PRU in an absence of power transmission to the remote PRU via the power transmission means; and means for terminating the control signaling link with the remote PRU while maintaining the supply of power and the control signaling link with the local PRU in response to detecting the cross-connection circumstance.

In Example 96, the subject matter of Example 95 optionally includes, further comprising: means for detecting the cross-connection circumstance based on a measurement of relative timing between establishment of the control signaling link with the remote PRU and a load variation expectation corresponding to near-field coupling of a local PRU with the power circuitry via the power transmission means.

In Example 97, the subject matter of any one or more of Examples 95-96 optionally include, further comprising: means for detecting the cross-connection circumstance based on an indication, via the control signaling link with the remote PRU, of received power by the remote PRU, and an absence of a measured load variation by the power circuitry of the PTU.

In Example 98, the subject matter of any one or more of Examples 95-97 optionally include, further comprising: means for detecting the cross-connection circumstance based on: communicating a PTU-specific code by varying supply power; and determining, based on communicating via the control signaling link, of receipt failure of the PTU-specific code by any PRU.

In Example 99, the subject matter of any one or more of Examples 95-98 optionally include, further comprising: means for terminating the control signaling link with the remote PRU within a predefined time duration b; and means for maintaining the supply of power and the control signaling link with the local PRU for a time duration a; wherein a is greater than b.

In Example 100, the subject matter of any one or more of Examples 95-99 optionally include, further comprising: means for preventing establishment of a control signaling link with the remote PRU for a predefined time duration in response to termination of the control signaling link with the remote PRU.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus for a power transmitting unit (PTU) to supply power to a local power receiving unit (PRU) via coupling between a power transmission transducer of the PTU and the PRU, the apparatus comprising:
   power circuitry to drive the power transmission transducer;
   wireless communication circuitry to establish a control signaling link with the local PRU; and
   processing circuitry to control the power circuitry and wireless communication circuitry to:
   provide a supply of power and the control signaling link with the local PRU;
   detect a wrong-placement characteristic comprising power transfer to a rogue local PRU via the power transmission transducer in an absence of a control signaling link with the rogue local PRU, the wrong-placement characteristic being detected based on communication of a PTU-specific code that includes an ID value, by variation of the supply power via the transmission transducer, wherein the PTU-specific code is encoded in the supply power; and
   in response to detection of the wrong-placement characteristic, maintain the supply of power for at least a waiting period.

2. The apparatus of claim 1, wherein the processing circuitry is to control the power circuitry and wireless communication circuitry to:
   monitor for cessation of the wrong-placement characteristic during the waiting period; and
   in response to an expiration of the waiting period and a non-cessation of the wrong-placement characteristic during the waiting period, interrupt the supply of power.

3. The apparatus of claim 1, wherein the processing circuitry is further configured to control the power circuitry and wireless communication circuitry to:
   in response to cessation of the wrong placement characteristic during the waiting period, maintain the supply of power via the power transmission transducer; and
   in response to non-cessation of the wrong placement characteristic during the waiting period, terminate the supply of power via the power transmission transducer.

4. The apparatus of claim 1, wherein the processing circuitry is further configured to control the power circuitry and wireless communication circuitry to:
   adjust the waiting period based on an amount of output power being supplied via the power transmission transducer.

5. The apparatus of claim 1, wherein the processing circuitry is further configured to control the power circuitry and wireless communication circuitry to:
   detect a cross-connection circumstance between the PTU and a remote PRU wherein a control signaling link exists between the PTU and the remote PRU in an absence of power transmission to the remote PRU via the power transmission transducer;
   in response to the cross-connection circumstance detection, terminate the control signaling link with the remote PRU while the supply of power and the control signaling link is maintained with the local PRU.

6. The apparatus of claim 5, wherein the processing circuitry is further configured to control the power circuitry and wireless communication circuitry to detect the cross-connection circumstance based on:
   a communication of a PTU-specific code by variation of supply power via the transmission transducer; and
   determination, based on communications via the control signaling link, of receipt failure of the PTU-specific code by any PRU.

7. The apparatus of claim 5, wherein the processing circuitry is further configured to control the power circuitry and wireless communication circuitry to:
   terminate the control signaling link with the remote PRU within a predefined time duration b, and maintain the supply of power and the control signaling link with the local PRU for a time duration a, wherein a is greater than b.

8. The apparatus of claim 5, wherein the processing circuitry is further configured to control the power circuitry and wireless communication circuitry to:
   in response to termination of the control signaling link with the remote PRU, prevent establishment of a control signaling link with the remote PRU for a predefined time duration.

9. A method for operating a power transmitting unit (PTU) to supply power to a local power receiving unit (PRU) via coupling between a power transmission transducer of the PTU and the local PRU, the method comprising:
   providing a supply of power to the local PRU via the power transmission transducer;
   maintaining a control signaling link with the local PRU;
   detecting a wrong-placement characteristic comprising power transfer to a rogue local PRU via the power transmission transducer in an absence of a control signaling link with the rogue local PRU, including communicating a PTU-specific code, that includes an ID value, by variation of the supply power via the transmission transducer, wherein the PTU-specific code is encoded in the supply power;
   in response to detecting the wrong-placement characteristic, maintaining the supply of power via the power transmission transducer for at least a waiting period.

10. The method of claim 9, further comprising:
monitoring for cessation of the wrong-placement characteristic during the waiting period; and
in response to an expiration of the waiting period and a non-cessation of the wrong-placement characteristic during the waiting period, interrupting the supply of power.

11. The method of claim 9, further comprising:
in response to cessation of the wrong placement characteristic during the waiting period, maintaining the supply of power via the power transmission transducer; and
in response to non-cessation of the wrong placement characteristic during the waiting period, terminating the supply of power via the power transmission transducer.

12. The method of claim 9, further comprising:
adjusting the waiting period based on an amount of output power being supplied via the power transmission transducer.

13. The method of claim 9, further comprising:
detecting a cross-connection circumstance between the PTU and a remote PRU wherein a control signaling link exists between the PTU and the remote PRU in an absence of power transmission to the remote PRU via the power transmission transducer;
in response to detecting the cross-connection circumstance, terminating the control signaling link with the remote PRU while maintaining the supply of power and the control signaling link with the local PRU.

\* \* \* \* \*